US005103135A

United States Patent [19]

Lange et al.

[11] Patent Number: 5,103,135

[45] Date of Patent: Apr. 7, 1992

[54] GAS-DISCHARGE SURGE ARRESTER

[75] Inventors: Gerhard Lange; Andre Scheidt, both of Berlin, Fed. Rep. of Germany

[73] Assignee: Siemens Aktiengesellschaft, Berlin & Munich, Fed. Rep. of Germany

[21] Appl. No.: 671,892

[22] PCT Filed: Oct. 12, 1988

[86] PCT No.: PCT/DE88/00638

§ 371 Date: Mar. 27, 1991

§ 102(e) Date: Mar. 27, 1991

[87] PCT Pub. No.: WO90/03677

PCT Pub. Date: Apr. 5, 1990

[30] Foreign Application Priority Data

Sep. 27, 1988 [DE] Fed. Rep. of Germany ....... 3833167

[51] Int. Cl.[5] ............................................. H02H 3/22

[52] U.S. Cl. ............................... 313/623; 313/231.11; 313/635; 361/120; 361/129; 361/130

[58] Field of Search ................... 313/623, 635, 231.11; 361/119, 120, 124, 128, 129, 130

[56] References Cited

U.S. PATENT DOCUMENTS 1,340,657 5/1920 Jacobus ............................... 313/623
3,904,910 9/1975 Schleimann-Jensen ............. 313/623
4,266,260 5/1981 Lange et al. ........................ 361/120

FOREIGN PATENT DOCUMENTS 2828650 1/1980 Fed. Rep. of Germany .
0093682 5/1969 France .
2430082 1/1980 France .

*Primary Examiner*—Donald J. Yusko
*Assistant Examiner*—Diab Hamadi
*Attorney, Agent, or Firm*—Kenyon & Kenyon

[57] ABSTRACT

A gas-discharge surge arrester that can be manufactured at a low cost and suitable for automatic bulk processing. The surge arrester includes an insulator which comprises a small ceramic tube. A tin coating is applied to the electrodes, and an annular protective coating is applied to the ceramic insulator having a thickness of at least 1 mm. This protective coating is formed from an acid-resistant and heat-resistant colorant or varnish which is continuous in the axial direction of the surge arrester. The protective coating may form part of the identification of the surge arrester. For example, the identification may be in the form of a reverse imprint in the protective coating. In addition, tin-coated leads can be coupled to the electrodes.

8 Claims, 2 Drawing Sheets

GAS-DISCHARGE SURGE ARRESTER

BACKGROUND OF THE INVENTION

The present invention relates to electrical components and, more particularly, to the material design of the external surface of gas-discharge surge arresters.

Gas-discharge surge arresters have a variety of uses including the protection of telecommunication lines, for example. In this application surge arresters are used having electrodes with soldered-on, welded-on or integral leads. Such surge arresters may comprise two opposed electrodes and optionally a third, centrally located annular electrode. German Patent 28 28 650 discloses such a surge arrester. Like the electrodes, the leads attached to them are usually silver-plated if they are made of copper. Occasionally the use of tinned leads is required. In flow soldering the wetting of the leads is required during the soldering operation. If copper electrodes having welded-on copper leads are used, bronze (which is an alloy of copper and tin) may form near the weld when a tinned lead is welded to a copper electrode, weakening the weld mechanically and electrically. It is also known to use surge arresters without leads. With such arresters, the electrodes are contacted by spring action. It is also known to use surge arresters with alloyed-iron electrodes and to coat the electrodes with nickel. Moreover, it is common practice to apply identifying marks to the ceramic insulator of the surge arrester by imprinting it with symbols, numerals and letters.

There is a need for a surge arrester which can be manufactured at low cost and is suitable for automatic bulk processing without degradation of its insulating strength. There is also a need for a surge arrester that can be readily soldered into printed circuits or circuit boards.

SUMMARY OF THE INVENTION

These and other needs are satisfied by the gas-discharge surge arrester of the present invention. The gas-discharge surge arrester includes at least one tubular ceramic insulator having electrodes disposed at its ends. The electrodes are joined to the ceramic insulator in a gastight manner. The external surface of each electrode is provided with a tin protective coating.

An annular insulating protective coating of an acid-resistant and heat-resistant colorant or varnish that is continuous and unbroken in the axial direction of the insulator is applied to the circumference of each ceramic insulator having a width of at least 1 mm.

In this surge arrester the tin coating forms a low-cost metallic coating on the electrodes. Such a tin coating alone entails the risk that when the surge arresters are handled as a bulk material the tin coating will degrade on the rough circumference of the ceramic insulators, which could give rise to insulation faults. The application of the protective colorant or varnish coating eliminates such a risk. The protective coating forms a relatively smooth region on the circumference of the ceramic insulator in which no detrimental degradation of the tin can occur. The width of the protective coating is such that the minimum value of the insulating strength (e.g., $10^{10}$ ohms) is maintained even when degradation of tin does occur in the remaining portions of the circumference of the ceramic insulator.

Optionally, the protective coating may cover the entire external surface of the ceramic insulator. When the width of the protective coating exceeds 3 or 4 mm, the protective coating is utilized as part of the identification of the surge arrester. For this purpose, the protective coating may be reverse imprinted. However, the protective coating may also form a transparent and preferably colorless top coat for a conventional imprint or a substrate for a subsequent conventional imprint.

The acid resistance of the protective coating allows the use of electroplating treatments of the surge arrester. These electroplating treatments are required in the further course of manufacturing the surge arrester. Also, the heat resistance of the protective coating, which is at least 160° C., assures that when the component is subjected to alternating-current stresses the protective coating will not degrade (i.e, the protective coating will not be discolored). The acid- and heat-resistant varnish for the annular protective coating is preferably a commercial air-drying one-component varnish. Printing inks are suitable as acid- and heat-resistant colorants.

The surge arrester of the present invention may also be provided with tinned leads to permit mounting on printed-circuit boards and soldering to printed conductors. The use of tinned leads permits trouble-free soldering into printed circuits or circuit boards by flow soldering. When leads are used which are not integral with the electrodes, they may be tinned even before they are attached (e.g. soldered) to the electrodes. However, the leads may also be tinned together with the electrodes. When copper electrodes and leads are used, it is advantageous to weld the leads conventionally to the electrodes before the electrodes and the leads are tinned. This assures that bronze will not form between the leads and the electrodes in the vicinity of the welds.

In surge arresters which include leads which have already been appropriately bent by the manufacturer of the component for its installation in printed circuits, the bending operation is performed before the tin coating is applied. Thus, spalling of the tin coating at the bends is prevented.

DETAILED DESCRIPTION

Figure 1:
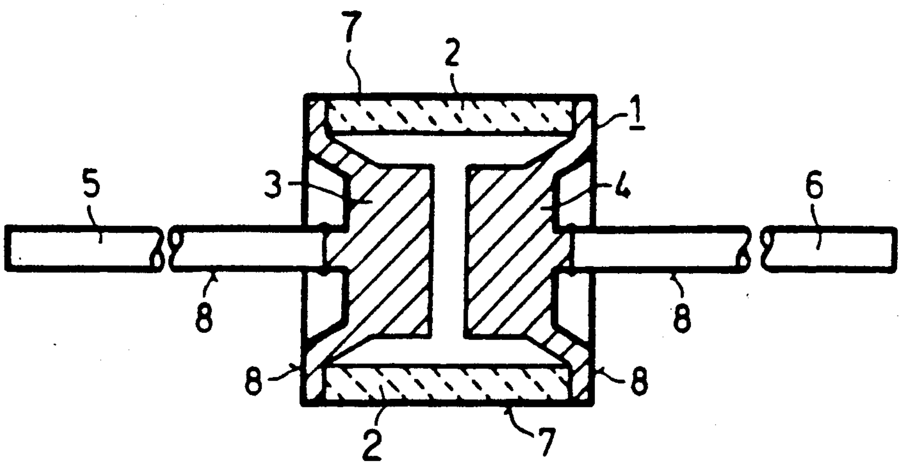
FIG. 1 is a surge arrester having two electrodes and leads.

Referring to FIG. 1, a surge arrester having two electrodes is shown. The surge arrester includes a tubular ceramic insulator 2 with electrodes 3 and 4 disposed at its ends. The electrodes are soldered in a gastight manner to the ceramic insulator 2. Copper leads 5 and 6 are welded to the electrodes, which are also made of copper. After the electrodes have been joined to the ceramic insulator, a varnish coating 7 is applied by a conventional printing method to the external surface of the insulator 2. The varnish coating covers the entire circumference of the insulator and has a width of about 5 mm. A width of 1 mm would be sufficient. When the width is less than the outside spacing of the two electrodes 3 and 4, the protective coating may be disposed centrally or off-center relative to the electrodes 3 and 4.

After the leads 5 and 6 have been welded to the electrodes, the surge arrester is subjected to an electroplating treatment in which a tin coating 8 is deposited on the external surface of the electrodes 3 and 4 and on the leads 5 and 6.

Figure 2:
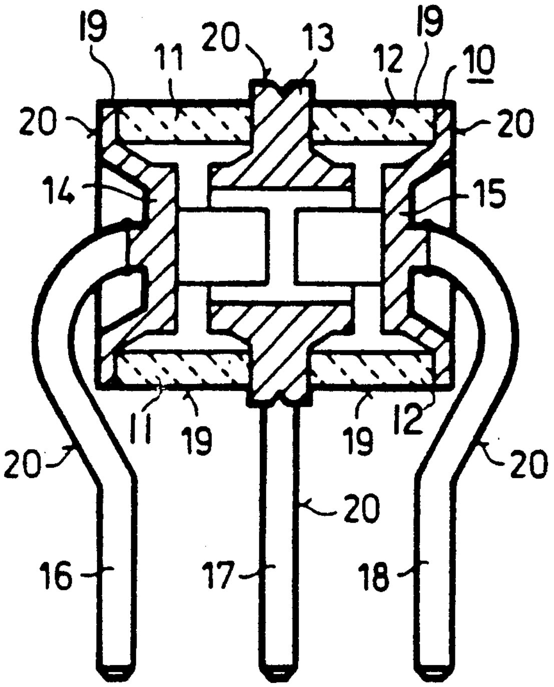
FIG. 2 is a surge arrester with three electrodes and leads.

Referring to FIG. 2, a gas-discharge surge arrester 10 having three electrodes is shown. The arrester comprises two tubular ceramic insulators 11 and 12 which are joined together coaxially by a ring electrode 13. Electrodes 14 and 15 are disposed at the other two ends of the ceramic insulators 11 and 12, respectively. Leads 16, 17 and 18 are welded to these electrodes and to the ring electrode 13. Both the electrodes and the leads are made of copper. In this surge arrester, as well, the ceramic insulators 11 and 12 are both provided with a varnish coating 19 after they have been joined to the electrodes 14 and 15 in a gastight manner. After the leads have been welded to the electrodes, the surge arrester is subjected to an electroplating treatment in which a tin coating 20 is deposited on the electrodes and on the leads.

Figure 3:
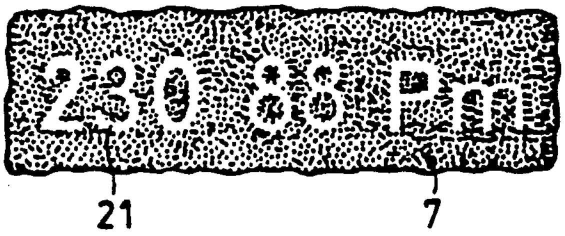
FIG. 3 is a fragmentary view of a protective coating in the form of a reverse imprint for the embodiment of FIG. 2.

The varnish coating 7 on the ceramic insulator 2 of FIG. 1 and the varnish coating 19 on one of the two ceramic insulators of FIG. 2 is applied as a reverse imprint for identification purposes. Such a reverse imprint is shown in the fragmentary view of FIG. 3 as reference numeral 21. Instead of reverse-imprinting, the ceramic insulator may be provided with normal, positive identification with a colorless or translucent varnish coating applied on top. It is also possible to first apply the protective coating of colorant or varnish and then apply an imprint of a color coordinated with the colorant or varnish coating.

Figure 4:
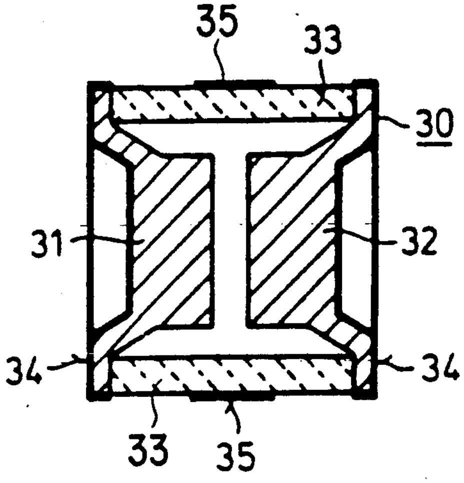
FIG. 4 is a surge arrester without leads.

Referring to FIG. 4, a surge arrester 30 having two electrodes 31 and 32 and a ceramic insulator 33 is shown. This surge arrester does not have leads. The electrodes 31 and 32 are made of copper and are provided with a tin coating 34. A protective coating 35 having a width of about 2 mm has been applied to the ceramic insulator.

We claim:

1. A gas-discharge surge arrester, comprising:

a tubular ceramic insulator having two ends and a circumferential surface surrounding an axis;

at least two electrodes coupled to the ends of said insulator in a gastight manner, each electrode including an outside surface;

a first metallic coating of tin covering the outside surfaces of said electrodes; and an annular insulating protective coating covering the circumferential surface of said tubular ceramic insulator, said protective coating being an acid-resistant and heat-resistant varnish having a thickness of at least 1 mm, whereby said protective coating is continuous and unbroken along the axis of said insulator.

2. The gas-discharge surge arrester of claim 1, wherein said protective coating is formed of an air-drying one-component varnish.

3. The gas-discharge surge arrester of claim 1, wherein said protective coating serves as identification for said surge arrester.

4. The gas-discharge surge arrester of claim 3, wherein said protective coating includes a reverse imprint for identification of said surge arrester.

5. The gas-discharge surge arrester of claim 1, further, comprising:

at least two leads coupled to said electrodes; and a second metallic coating of tin covering said leads.

6. The gas-discharge arrester of claim 5, wherein said leads are bent for installation in a printed circuit before said first and second metallic coatings are applied to said electrodes and said leads.

7. The gas-discharge arrester of claim 5, wherein said electrodes and said leads are formed from copper and each electrode is welded to one of said leads.

8. The gas-discharge arrester of claim 7, wherein each of said electrodes is welded to one of said leads before said first and second metallic coatings are applied to said electrodes and said leads.

* * * * *